US012720144B2

(12) United States Patent
Chiu et al.

(10) Patent No.: US 12,720,144 B2
(45) Date of Patent: Aug. 25, 2026

(54) STREAMING A SEGMENTED ARTIFICIAL INTELLIGENCE VIRTUAL ASSISTANT WITH PROBABILISTIC BUFFERING

(71) Applicant: Loop Now Technologies, Inc., San Mateo, CA (US)

(72) Inventors: Edwin Chiu, Cupertino, CA (US); Nikola Dichev, San Diego, CA (US); Shi Feng, East Palo Alto, CA (US); Wu-Hsi Li, Somerville, MA (US); Hong-Ming Tseng, Toronto (CA); Jeremiah Kevin Tu, Sunnyvale, CA (US); Xiaochen Zhang, Shanghai (CN)

(73) Assignee: Loop Now Technologies, Inc., San Mateo, CA (US)

(*) Notice: Subject to any disclaimer, the term of this patent is extended or adjusted under 35 U.S.C. 154(b) by 3 days.

(21) Appl. No.: 19/062,155

(22) Filed: Feb. 25, 2025

(65) Prior Publication Data

US 2025/0193477 A1 Jun. 12, 2025

Related U.S. Application Data

(63) Continuation-in-part of application No. 18/989,061, filed on Dec. 20, 2024, which is a (Continued)

(51) Int. Cl.
*H04N 21/43* (2011.01)
*H04N 21/254* (2011.01)
(Continued)

(52) U.S. Cl.
CPC ... *H04N 21/43072* (2020.08); *H04N 21/2542* (2013.01); *H04N 21/4394* (2013.01);
(Continued)

(58) Field of Classification Search
CPC ......... H04N 21/43072; H04N 21/2542; H04N 21/4394; H04N 21/44004;
(Continued)

(56) References Cited

U.S. PATENT DOCUMENTS 9,824,372 B1 11/2017 Seth et al.
2014/0089804 A1* 3/2014 Gazit ...................... G06T 13/80 715/723

(Continued)

*Primary Examiner* — Cynthia M Fogg
(74) *Attorney, Agent, or Firm* — Adams Intellex, PLC

(57) ABSTRACT

Techniques for video streaming are disclosed. A plurality of audio files is accessed. The audio files comprise answers from a large language model to a user requesting information on products for sale. Each audio file is used to produce a video segment, featuring an animated artificial intelligence virtual assistant performing the audio file. The animating uses a Mel spectrogram analysis of the audio file. The audio analysis allows each word, sound, or phoneme of the audio file to be aligned with the matching video frame of the virtual assistant speaking each word. As the first video segment is streamed to the user, additional audio files are used to produce more video segments. The subsequent video segments are buffered based on a probabilistic model as the previous segments are streamed, so that as each video segment is completed, the next segment begins.

21 Claims, 9 Drawing Sheets

Related U.S. Application Data continuation-in-part of application No. 18/820,456, filed on Aug. 30, 2024, which is a continuation-in-part of application No. 18/585,212, filed on Feb. 23, 2024, now abandoned.

(60) Provisional application No. 63/649,966, filed on May 21, 2024, provisional application No. 63/638,476, filed on Apr. 25, 2024, provisional application No. 63/571,732, filed on Mar. 29, 2024, provisional application No. 63/557,622, filed on Feb. 26, 2024, provisional application No. 63/557,628, filed on Feb. 26, 2024, provisional application No. 63/557,623, filed on Feb. 26, 2024, provisional application No. 63/613,312, filed on Dec. 21, 2023, provisional application No. 63/604,261, filed on Nov. 30, 2023, provisional application No. 63/546,768, filed on Nov. 1, 2023, provisional application No. 63/546,077, filed on Oct. 27, 2023, provisional application No. 63/536,245, filed on Sep. 1, 2023, provisional application No. 63/524,900, filed on Jul. 4, 2023, provisional application No. 63/522,205, filed on Jun. 21, 2023, provisional application No. 63/472,552, filed on Jun. 12, 2023, provisional application No. 63/464,207, filed on May 5, 2023, provisional application No. 63/458,733, filed on Apr. 12, 2023, provisional application No. 63/458,458, filed on Apr. 11, 2023, provisional application No. 63/458,178, filed on Apr. 10, 2023, provisional application No. 63/454,976, filed on Mar. 28, 2023, provisional application No. 63/447,925, filed on Feb. 24, 2023, provisional application No. 63/447,918, filed on Feb. 24, 2023.

(51) Int. Cl.
*H04N 21/439* (2011.01)
*H04N 21/44* (2011.01)
*H04N 21/478* (2011.01)
*H04N 21/81* (2011.01)

(52) U.S. Cl.
CPC . *H04N 21/44004* (2013.01); *H04N 21/47815* (2013.01); *H04N 21/8106* (2013.01)

(58) Field of Classification Search
CPC ......... H04N 21/47815; H04N 21/8106; H04N 21/47217; H04N 21/4788; H04N 21/8456; G06N 3/0475; G10L 13/033; G10L 25/57; G10L 2021/105; G10L 13/047; G10L 21/10; G06Q 20/3223; G06Q 20/12; G06Q 30/015; G06Q 30/0641; G06Q 30/0643; G06T 13/205; G06F 40/35
USPC ........................................................ 725/116
See application file for complete search history.

(56) References Cited

U.S. PATENT DOCUMENTS

| | | | | |
|---|---|---|---|---|
| 2014/0270711 | A1* | 9/2014 | Maser | G11B 27/034 386/290 |
| 2015/0177940 | A1 | 6/2015 | Trevino et al. | |
| 2016/0093291 | A1* | 3/2016 | Kim | G10L 25/60 381/56 |
| 2017/0011745 | A1* | 1/2017 | Navaratnam | H04N 7/157 |
| 2021/0014559 | A1 | 1/2021 | Thapaliya | |
| 2022/0122161 | A1 | 4/2022 | Perera | |
| 2022/0191594 | A1 | 6/2022 | Devoy, III et al. | |
| 2022/0208155 | A1* | 6/2022 | Ivers | G10H 1/368 |
| 2022/0345755 | A1 | 10/2022 | Pollock et al. | |
| 2022/0353473 | A1 | 11/2022 | Springer | |
| 2023/0126108 | A1 | 4/2023 | Roper | |

* cited by examiner

STREAMING A SEGMENTED ARTIFICIAL INTELLIGENCE VIRTUAL ASSISTANT WITH PROBABILISTIC BUFFERING

RELATED APPLICATIONS

This application claims the benefit of U.S. provisional patent applications "Artificial Intelligence Virtual Assistant With LLM Streaming" Ser. No. 63/557,622, filed Feb. 26, 2024, "Self-Improving Interactions With An Artificial Intelligence Virtual Assistant" Ser. No. 63/557,623, filed Feb. 26, 2024, "Streaming A Segmented Artificial Intelligence Virtual Assistant With Probabilistic Buffering" Ser. No. 63/557,628, filed Feb. 26, 2024, "Artificial Intelligence Virtual Assistant Using Staged Large Language Models" Ser. No. 63/571,732, filed Mar. 29, 2024, "Artificial Intelligence Virtual Assistant In A Physical Store" Ser. No. 63/638,476, filed Apr. 25, 2024, and "Ecommerce Product Management Using Instant Messaging" Ser. No. 63/649,966, filed May 21, 2024.

This application is a continuation-in-part of U.S. patent application "Artificial Intelligence Virtual Assistant Using Large Language Model Processing" Ser. No. 18/989,061, filed Dec. 20, 2024, which claims the benefit of U.S. provisional patent applications "Artificial Intelligence Virtual Assistant Using Large Language Model Processing" Ser. No. 63/613,312, filed Dec. 21, 2023, "Artificial Intelligence Virtual Assistant With LLM Streaming" Ser. No. 63/557,622, filed Feb. 26, 2024, "Self-Improving Interactions With An Artificial Intelligence Virtual Assistant" Ser. No. 63/557,623, filed Feb. 26, 2024, "Streaming A Segmented Artificial Intelligence Virtual Assistant With Probabilistic Buffering" Ser. No. 63/557,628, filed Feb. 26, 2024, "Artificial Intelligence Virtual Assistant Using Staged Large Language Models" Ser. No. 63/571,732, filed Mar. 29, 2024, "Artificial Intelligence Virtual Assistant In A Physical Store" Ser. No. 63/638,476, filed Apr. 25, 2024, and "Ecommerce Product Management Using Instant Messaging" Ser. No. 63/649,966, filed May 21, 2024.

The U.S. patent application "Artificial Intelligence Virtual Assistant Using Large Language Model Processing" Ser. No. 18/989,061, filed Dec. 20, 2024 is also a continuation-in-part of U.S. patent application "Livestream With Large Language Model Assist" Ser. No. 18/820,456, filed Aug. 30, 2024, which claims the benefit of U.S. provisional patent applications "Livestream With Large Language Model Assist" Ser. No. 63/536,245, filed Sep. 1, 2023, "Non-Invasive Collaborative Browsing" Ser. No. 63/546,077, filed Oct. 27, 2023, "AI-Driven Suggestions For Interactions With A User" Ser. No. 63/546,768, filed Nov. 1, 2023, "Customized Video Playlist With Machine Learning" Ser. No. 63/604,261, filed Nov. 30, 2023, "Artificial Intelligence Virtual Assistant Using Large Language Model Processing" Ser. No. 63/613,312, filed Dec. 21, 2023, "Artificial Intelligence Virtual Assistant With LLM Streaming" Ser. No. 63/557,622, filed Feb. 26, 2024, "Self-Improving Interactions With An Artificial Intelligence Virtual Assistant" Ser. No. 63/557,623, filed Feb. 26, 2024, "Streaming A Segmented Artificial Intelligence Virtual Assistant With Probabilistic Buffering" Ser. No. 63/557,628, filed Feb. 26, 2024, "Artificial Intelligence Virtual Assistant Using Staged Large Language Models" Ser. No. 63/571,732, filed Mar. 29, 2024, "Artificial Intelligence Virtual Assistant In A Physical Store" Ser. No. 63/638,476, filed Apr. 25, 2024, and "Ecommerce Product Management Using Instant Messaging" Ser. No. 63/649,966, filed May 21, 2024.

The U.S. patent application "Livestream With Large Language Model Assist" Ser. No. 18/820,456, filed Aug. 30, 2024 is also a continuation-in-part of U.S. patent application "Synthesized Realistic Metahuman Short-Form Video" Ser. No. 18/585,212, filed Feb. 23, 2024, which claims the benefit of U.S. provisional patent applications "Synthesized Realistic Metahuman Short-Form Video" Ser. No. 63/447,925, filed Feb. 24, 2023, "Dynamic Synthetic Video Chat Agent Replacement" Ser. No. 63/447,918, filed Feb. 24, 2023, "Synthesized Responses To Predictive Livestream Questions" Ser. No. 63/454,976, filed Mar. 28, 2023, "Scaling Ecommerce With Short-Form Video" Ser. No. 63/458,178, filed Apr. 10, 2023, "Iterative AI Prompt Optimization For Video Generation" Ser. No. 63/458,458, filed Apr. 11, 2023, "Dynamic Short-Form Video Transversal With Machine Learning In An Ecommerce Environment" Ser. No. 63/458,733, filed Apr. 12, 2023, "Immediate Livestreams In A Short-Form Video Ecommerce Environment" Ser. No. 63/464,207, filed May 5, 2023, "Video Chat Initiation Based On Machine Learning" Ser. No. 63/472,552, filed Jun. 12, 2023, "Expandable Video Loop With Replacement Audio" Ser. No. 63/522,205, filed Jun. 21, 2023, "Text-Driven Video Editing With Machine Learning" Ser. No. 63/524,900, filed Jul. 4, 2023, "Livestream With Large Language Model Assist" Ser. No. 63/536,245, filed Sep. 1, 2023, "Non-Invasive Collaborative Browsing" Ser. No. 63/546,077, filed Oct. 27, 2023, "AI-Driven Suggestions For Interactions With A User" Ser. No. 63/546,768, filed Nov. 1, 2023, "Customized Video Playlist With Machine Learning" Ser. No. 63/604,261, filed Nov. 30, 2023, and "Artificial Intelligence Virtual Assistant Using Large Language Model Processing" Ser. No. 63/613,312, filed Dec. 21, 2023.

Each of the foregoing applications is hereby incorporated by reference in its entirety.

FIELD OF ART

This application relates generally to video streaming and more particularly to streaming a segmented artificial intelligence virtual assistant with probabilistic buffering.

BACKGROUND

Selling products and support services is one of the oldest endeavors in the history of human civilization. As far back as our recorded history can be traced, people have developed personal skills and abilities and have used them to exchange their products and services for those of others. In ancient times as well as today, bartering between and among two or more parties has been a common means of exchanging one's goods or services for those of someone else. Many long-term relationships and thriving businesses have begun and continue to operate based on deals made by a simple handshake or verbal agreement. As business, commerce, and trade relationships developed, the demand for a common medium of exchange led to the development of currencies. At first, hard currencies in the form of precious stones, metals, or other materials were used. As time and technology progressed, more electronic and digital forms of currency have developed, with the same goal in mind—to establish and maintain a common, dependable means of exchange across distances and cultures.

As the means of buying and selling have become more standardized, the techniques used to sell goods and services have become more elaborate and sophisticated. Some sales elements are universal in nature. Making a great first impression is key for even the simplest transaction. Customers tend to go to the store where the salesperson is friendly and relates well, whether choosing where to buy milk or purchase a car. Bank customers have favorite tellers, shoppers have salespeople they prefer, and purchasing agents work with sales representatives they have known for years, in some cases. The successful sales and support person works to build strong relationships with their customers through personalization and follow up. They are interested in more than just a single transaction. They are looking for a business relationship that lasts through multiple sales and service interactions. They know the customer and what the customer needs, and they work to make sure the needs are met, if not exceeded. They ask good questions to identify the best product or service offering for the client, and to anticipate potential needs for future sales.

Successful sales interactions require a thorough knowledge of the products and services being offered. A strong salesperson can help a customer identify their problems and understand how the company's offerings can help to solve the problems and meet unique customer needs—even needs the customer may not have understood at the onset of the relationship. In these communications, the salesperson must be genuine. Honesty in sales and service relationships is the best policy. Researching both products and customer needs is essential in understanding prospects and how best to support them. Identifying other customers with similar needs and showing how the company's offerings have satisfied those needs can be a powerful way to build trust. Customer testimonials, case studies, and other forms of social proof can go a long way to show that a company's products or services are effective.

Strong sales and service delivery methods are grounded in fundamental elements found in many successful human relationships. Honesty, respect, genuine interest in the other person's problems and needs, and effective communication about products and services to meet the needs are critical elements to successful sales. In addition, effective sales relationships require persistence, confidence, and in many cases, patience. Developing the best sales and support relationships can take time, but can yield the best results in terms of long-term sales and repeat business.

SUMMARY

Profitable sales and customer service depend upon effective communication skills, along with comprehensive product knowledge. Regardless of the communication method, the sales or support person must know the product, know how to support it, and be able to communicate successfully with the customer. The relationship, however temporary, between company representative and customer must engage the user in a way that encourages them to purchase products, take advantage of available service options, and return for additional offerings. Forming good rapport with a customer is both art and science. Listening to the customer to understand the information they need, addressing concerns, and presenting the answers in an effective and engaging manner takes practice, even for professional sales and customer service staff members. The more quickly and reliably the correct information that the customer requires can be accessed and delivered, the better. As the global market grows the potential customer base, strong sales and support outlets must expand and diversify to meet the demand.

Techniques for video streaming are disclosed. A plurality of audio files is accessed. The audio files comprise answers from a large language model to a user requesting information on products for sale. Each audio file is used to produce a video segment, featuring an animated artificial intelligence virtual assistant performing the audio file. The animating uses a Mel spectrogram analysis of the audio file. The audio analysis allows each word, sound, or phoneme of the audio file to be aligned with the matching video frame of the virtual assistant speaking each word. As the first video segment is streamed to the user, additional audio files are used to produce more video segments. The subsequent video segments are buffered based on a probabilistic model as the previous segments are streamed, so that as each video segment is completed, the next segment begins.

A computer-implemented method for video streaming is disclosed comprising: accessing a plurality of audio files, wherein each audio file in the plurality of audio files comprises a section of an answer to a user, wherein the answer is related to one or more products for sale, and wherein the answer is based on a large language model; producing a first video segment, wherein the first video segment is based on a first audio file within the plurality of audio files, wherein the producing includes animating an artificial intelligence virtual assistant, wherein the animating is based on the first audio file; streaming, within an embedded interface, the first video segment, wherein the streaming the first video segment includes the first audio file; creating a second video segment, wherein the second video segment is based on a second audio file within the plurality of audio files, wherein the animating includes the second audio file; buffering a length of the second video segment, wherein the length of the second video segment that was buffered is determined by a probabilistic model, wherein the buffering occurs during the streaming the first video segment; and streaming the second video segment, wherein the streaming the second video segment includes the second audio file, wherein the streaming the first video segment is complete. In embodiments, the probabilistic model is based on one or more of a producing time, a streaming time, and a network delay. Some embodiments comprise making a third video segment, wherein the third video segment is based on a third audio file within the plurality of audio files, wherein the animating includes the third video segment. Some embodiments comprise buffering a part of the third video segment, wherein the part of the third video segment is determined by the probabilistic model. Some embodiments comprise profiling a baseline video, wherein the baseline video is based on an avatar, wherein the profiling captures a plurality of frames of the avatar, wherein the capturing is based on a mouth position of the avatar.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
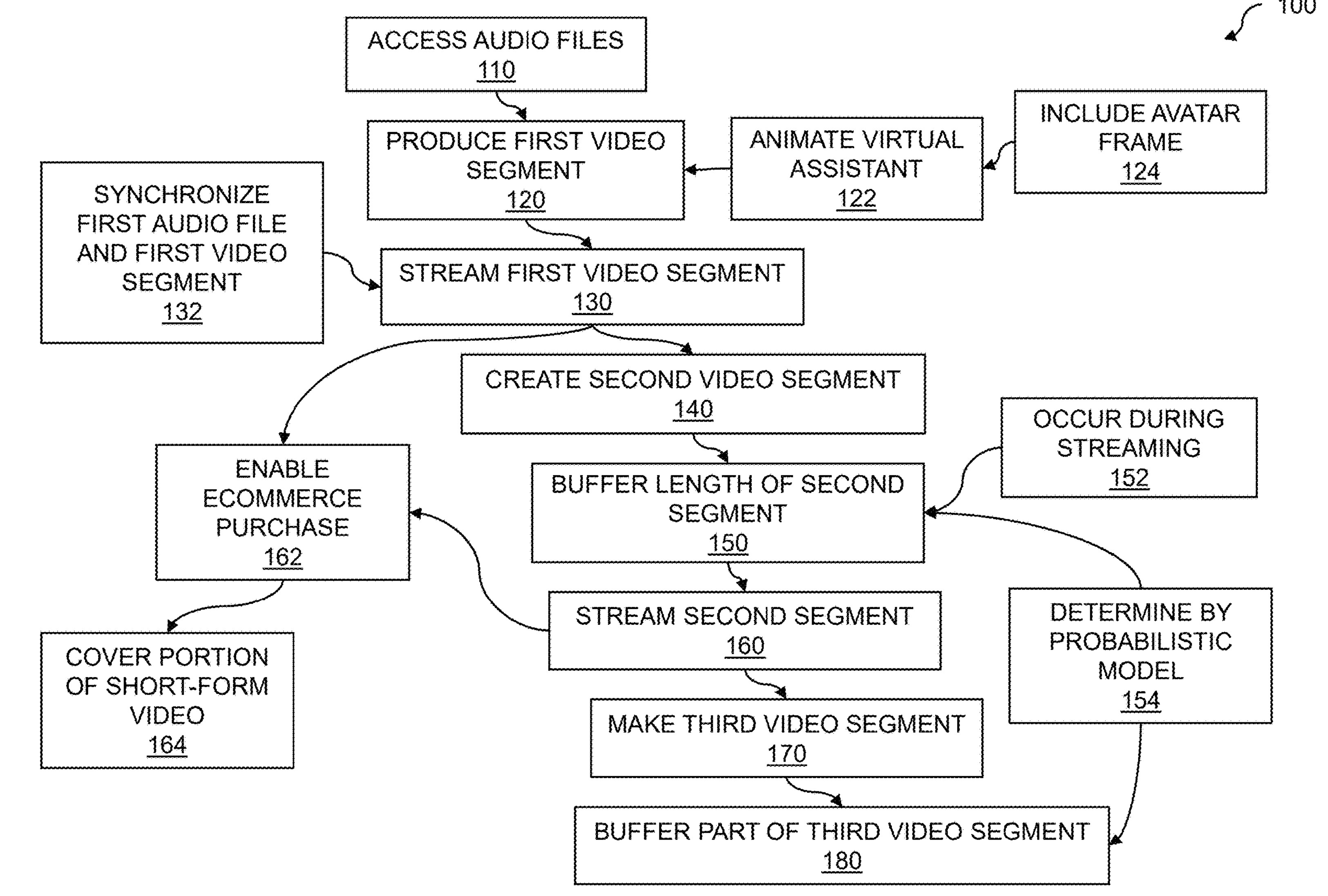
FIG. 1 is a flow diagram for streaming a segmented artificial intelligence virtual assistant with probabilistic buffering.

Websites and mobile applications that offer products and services for sale are so popular as to be assumed for many sectors of the global marketplace. Online stores and support outlets can easily engage hundreds if not thousands of users. Along with the technical challenges involved in supporting and maintaining connections with customers, the challenge of responding to viewer questions and comments quickly and accurately can be even more difficult. Finding the right information quickly and getting it to the user can be the difference between a sale or a potential customer leaving the website. Presenting the answers in a way that engages the user and invites additional interaction can make an enormous difference in completing the immediate sale, as well as the next one. Large language models (LLMs) including natural language processing (NLP) can help by monitoring the user interactions and generating answers to questions as they arise. Delivering the answers through an engaging sales associate or help desk representative can increase the chances of product and support sales opportunities. As the volume of digital communication increases for sales and customer support, the uses of LLMs combined with lifelike video representatives can help encourage rapid and accurate viewer engagement, increased sales, and long-term customer/vendor relationships.

Techniques for video streaming are disclosed. A user can interact with a website or mobile application that includes an artificial intelligence (AI) virtual assistant. As the user generates comments and questions about products and services offered on the website, the user input can be captured and sent to a large language model (LLM) for analysis. The LLM can use natural language processing to interpret the user input and generate a response to the first user question. The response can be based on product articles; vendor website information; product or sales brochures; product experts, social media influencers; previous interactions between sales, support staff, and users; and so on. The response generated by the LLM can be converted into one or more audio segments. A first audio segment in the one or more audio segments can be recorded in the voice of the artificial intelligence virtual assistant. The first audio segment can be analyzed using a Mel spectrograph to identify words, sounds, and phonemes associated with the entire segment. The first audio segment analysis can be used to select video frames from a library of video frames that includes performances of the artificial intelligence virtual assistant avatar pronouncing the same words, sounds, and phonemes that occur in the audio segment. The set of video frames selected from the library can be used to produce a first video segment showing the AI virtual assistant performing the first audio segment. The Mel spectrogram analysis can be used to synchronize the video frames with the words, sounds, and phonemes in the audio segment. As the first video segment is produced, it can be streamed to the user through an embedded interface included in the website or mobile application.

As the user is viewing the first video segment, additional video segments stemming from other audio segments can be produced and stored in one or more memory buffers for streaming once the first video segment is complete. The production of the second, third, fourth, and so on video segments can use the same process as the first video segment. The additional video segments can be continuations of the LLM response to the first user question. Buffering the second and subsequent video segment data in memory allows the video segments to be streamed to the user as quickly as possible. Buffering also allows the second and subsequent video data segments to be produced and stored in buffers, while the user is viewing earlier segments. The length of the second and subsequent video segments can be determined by a probabilistic model. The probabilistic model can be based on multiple factors involved in the production and streaming of the video segments. The probabilistic model can be based on one or more of a producing time, a streaming time, network response time, the number of questions and comments made by the user, the rate at which user comments are made, the amount of information available on products being presented, the complexity of the AI virtual assistant avatar, the language being used, etc. Using a probabilistic model allows the delivery of the AI virtual assistant videos to be better aligned with the natural ebb and flow of human interactions. It can also be used to allocate technical resources in order to produce additional video content as quickly as possible. Instead of awkward pauses while traditional models process answers, the result of disclosed embodiments is an ongoing interaction between the user and the artificial intelligence virtual assistant that is engaging, is informative, has minimal delay, and is effective in moving the user to purchasing products and services and returning for additional offerings in the future.

FIG. 1 is a flow diagram for streaming a segmented artificial intelligence virtual assistant with probabilistic buffering. The flow 100 includes accessing 110 a plurality of audio files, wherein each audio file in the plurality of audio files comprises a section of an answer to a user, wherein the answer is related to one or more products for sale, and wherein the answer is based on a large language model. A large language model (LLM) is a type of machine learning model that can perform a variety of natural language tasks, including generating and classifying text, answering questions in a human conversational manner, and translating text from one language to another. In embodiments, the LLM can be trained with voice and text interactions between users, human sales associates, help desk staff members, product experts, and AI virtual assistants. Information articles and questions covering products and services offered for sale by the website can be included in the LLM database. The information on products can be analyzed by the LLM and used to generate answers to questions and comments related to products and services offered for sale. Some user questions can elicit simple LLM responses that require only a few words. For example, a user can ask, "Does this car come in orange?" The LLM response can be a simple yes or no, or can also include information about available colors. Other user queries can require several paragraphs of information. For example, a user can say, "Tell me more about this car." In response, the LLM can generate information about the car's performance, features, available styles, colors, pricing, delivery schedules, versions of the car available immediately, and so on. The answers generated by the LLM can be data streams of text.

In some embodiments, answers generated by the LLM can be scored based on their correctness. A correct answer must address the question actually asked by the user and provide the appropriate information based on the information article related to the product or service involved. In embodiments, the LLM can start a self-learning process when an answer is not available or under a score threshold. The self-learning process can include crawling web sites or generating instructions to update a database of product information. The updating can be accomplished by a client management system (CMS).

In embodiments, the text data from the LLM can be converted by a text-to-speech (TTS) converter to an audio file. The text-to-speech converter can include a synthesized voice based on a voiceprint from a human. The synthesized voice can include AI-generated speech. The synthesized voice can be used to perform the one or more text responses to the user created by the LLM. In embodiments, a plurality of audio files can be generated, with each audio file addressing a portion of an answer to one or more questions generated by the user. Each portion of the LLM response can be converted to an audio file by the TTS converter and stored for video segment production.

The flow 100 includes producing 120 a first video segment, wherein the first video segment is based on a first audio file within the plurality of audio files, wherein the producing includes animating 122 an artificial intelligence (AI) virtual assistant, wherein the animating is based on the first audio file. In embodiments, the first audio response generated by the LLM and TTS converter can be forwarded to one or more processors that can include 2D and/or 3D images of the AI virtual assistant. The producing can include a game engine. A game engine is a set of software applications that work together to create a framework for users to build and create video games. They can be used to render graphics, generate and manipulate sound, create and modify physics within the game environment, detect collisions, manage computer memory, and so on. The game engine can use one or more 2D and/or 3D images of the AI virtual assistant to generate animated movements of the virtual assistant. The AI virtual assistant animating can include actions of the eyes, mouth, lips, and face that mimic human movements speaking words and phrases. The image of the artificial intelligence virtual assistant can be combined with the synthesized voice and used to animate the artificial intelligence virtual assistant and produce a first video segment of the synthetic human performing the first audio segment.

The flow 100 includes profiling a baseline video, wherein the baseline video is based on an avatar, wherein the profiling captures a plurality of frames of the avatar 124, wherein the capturing is based on a mouth position of the avatar. In embodiments, the baseline video comprises one or more still pictures. In some embodiments, the avatar is a human. The one or more still pictures can be captured from video frames of the avatar. The still pictures can include photographs of the avatar. In embodiments, the baseline video can include the avatar speaking each sound or phoneme of a language that can be used to respond to the user. A phoneme is a discrete sound that is associated with a letter or a combination of letters of the alphabet. Some letters have more than one associated phoneme, such as a long "a" and a short "a" sound. Phonemes can also be associated with letter combinations, such as "th," "qu," "ing," and so on. Different languages have different numbers of phonemes. The baseline video can be separated into groups of video frames with each group displaying the avatar speaking one sound or phoneme. Thus, a database of video frames of the avatar pronouncing every sound required to produce any word in a language can be stored and used to generate videos of the avatar speaking. The phonemes can be mapped to corresponding face, mouth, lip, and/or eye movements so that as a word is spoken by the avatar, the movement of the mouth, lip, face, and/or eyes correspond. The game engine can use the avatar frames that were captured to produce the first video segment.

The flow 100 includes synchronizing the first audio file and the first video segment 132. In embodiments, the first audio segment can be broken down into sound or phonemes. The phonemes can be used to select video segments from the library of baseline avatar frames. The selected groups of avatar video frames can be combined to produce the first video segment. The avatar frames can be aligned with the audio file to synchronize the first video segment with the audio file. Thus, the synthetic human can be seen speaking the words contained in the audio segment as naturally as a real human does. In some embodiments, speech errors and pauses added by the LLM can be included in the video clip. For example, when the synthetic human pauses to "think" in the midst of a sentence, the eyes can look down and to the right or up at the ceiling, along with slight tilts of the head, and so on to simulate the process of thinking.

The flow 100 includes streaming, within an embedded interface, the first video segment 130, wherein the streaming the first video segment includes the first audio file. As the frames of the first video segment are produced and synchronized, they can be presented immediately to the user. The embedded interface displays the assembled video segment performed by the AI virtual assistant in a webpage window, video chat window, etc. In embodiments, as the user views the first video segment and produces additional questions or comments, capturing of the user comments, LLM processing, TTS converting, video producing, and streaming can be repeated. The user can continue to interact with the AI virtual assistant, generating additional input collected by the embedded interface. The collecting of user input, creating a response, producing audio segments and related video clips, and streaming to the user can continue, so that the interaction between the user and the AI virtual assistant appears as natural as two humans interacting within a video chat. In embodiments, the embedded interface can comprise a website. The website can be an ecommerce site for a single vendor or brand, a group of businesses, a social media platform, and so on. The website can be displayed on a portable device. The portable device can be an Over-the-Top (OTT) device such as a mobile phone, laptop computer, tablet, or pad. The accessing of the website can be accomplished using a browser running on the device. In embodiments, the embedded interface comprises an app running on a mobile device. The app can use HTTP, TCP/IP, or DNS to communicate with the Internet, web servers, cloud-based platforms, and so on.

The flow 100 includes creating 140 a second video segment, wherein the second video segment is based on a second audio file within the plurality of audio files, wherein the animating 122 includes the second audio file. In embodiments, the production of the second video segment can match the process used to produce the first video segment. The second LLM text response to a user question can be used to create a second audio segment. The second audio segment can be created using a text-to-speech converter that includes the voice of the AI virtual assistant. The second audio segment can be analyzed and separated into distinct sounds or phonemes that can be used to select groups of video frames from a library of avatar video frames speaking each sound or phoneme in the second audio file. The selected video frames can be assembled and synchronized to create the second video segment. This synchronizing includes the second audio file and the second video segment.

The flow 100 includes buffering 150 a length of the second video segment, wherein the length of the second video segment that was buffered is determined by a probabilistic model, wherein the buffering occurs during the streaming the first video segment. Buffering is the process of preloading and storing data in a reserved area of memory called a buffer. In embodiments, the buffering can include one or more sections of the second video segment. The buffering can occur during the streaming of the first video 152. The advantage of placing the second and subsequent video segment data in memory buffers is that it allows the video segments to be streamed to the user as quickly as possible. In this case, the user only needs to wait for the first video segment to be prepared rather than waiting for the entire video production process. Buffering can also allow the second and subsequent video data segments to be produced and stored in buffers, while the user is viewing earlier segments. A probabilistic model is a statistical model that can use probabilities and statistical formulas to learn patterns from data and make predictions about new data as it is acquired. In embodiments, one or more probabilistic models 154 can be used to determine how long the first video segment will take to stream within the embedded interface. A portion of the second video segment can then be buffered so that once the first video segment is streamed, the second video segment can immediately begin streaming. This streaming and buffering can make it appear to the user as if a continuous video is being streamed to answer the user's question asked of the artificial intelligence virtual assistant. In embodiments, the length of the second video segment that was buffered is determined by the probabilistic model. The probabilistic model can be based on multiple factors involved in the production and streaming of the video segments. The probabilistic model can be based on one or more of a producing time, a streaming time, and a network delay. The probabilistic model can be based on the number of questions and comments made by the user, the rate at which user comments are made, the amount of information available on products being presented, the complexity of the AI virtual assistant avatar, the language being used, and so on.

The flow 100 includes streaming 160 the second video segment, wherein the streaming the second video segment includes the second audio file, wherein the streaming the first video segment is complete. In embodiments, as soon as the first video segment has completed streaming, the second video segment can be obtained from the memory buffers and streamed to the user. As the buffers are freed up from copying one video segment to the streaming process, they can be filled with subsequent video segments produced for the user. In embodiments, the streaming the first video segment and the streaming the second video segment can comprise a short-form video. The streaming can enable an ecommerce purchase 162, within the short-form video, of the one or more products for sale. In embodiments, the ecommerce purchase includes a representation of the one or more products for sale in an on-screen product card. The enabling the ecommerce purchase includes a virtual purchase cart. The virtual purchase cart covers 164 a portion of the short-form video. The AI virtual assistant can demonstrate, endorse, recommend, and otherwise interact with one or more products for sale. An ecommerce purchase of at least one product for sale can be enabled to the user, wherein the ecommerce purchase is accomplished within the embedded interface. As the AI virtual assistant interacts with and presents the products for sale, a product card representing one or more products for sale can be included within a video shopping window. An ecommerce environment associated with the video can be generated on the viewer's mobile device or other connected television device as the rendering of the video progresses. The ecommerce environment on the viewer's mobile device can display a livestream or other video event and the ecommerce environment at the same time. A mobile device user can interact with the product card in order to learn more about the product with which the product card is associated. While the user is interacting with the product card, the short-form video continues to play. Purchase details of the at least one product for sale can be revealed, wherein the revealing is rendered to the viewer. The viewer can purchase the product through the ecommerce environment, including a virtual purchase cart. The viewer can purchase the product without having to "leave" the short-form video. Leaving the video can include having to disconnect from the event, open an ecommerce window separate from the short-form video, and so on. The video can continue to play while the viewer is engaged with the ecommerce purchase. In embodiments, the short-form video can continue "behind" the ecommerce purchase window, where the virtual purchase window can obscure or partially obscure the video window.

The flow 100 includes making a third video segment 170, wherein the third video segment is based on a third audio file within the plurality of audio files, wherein the animating includes the third video segment. The making a third video segment 170 can further comprise buffering a part of the third video segment 180, wherein the part of the third video segment is determined by the probabilistic model. As mentioned above and throughout, the user can generate additional questions and comments while interacting with the AI virtual assistant. The responses to the user can be long or short, depending on the amount of information required to answer the question. As the LLM generates a third or more responses to the user, the responses can be converted to audio segments. The audio segments can be used to produce video segments synchronized with the audio segments. As the third and subsequent video segments are produced, they can be placed in memory buffers based on the probabilistic model and streamed to the user as soon as the user has viewed the previous video segment. The entire process of gathering a user's questions or comments, producing audio and video responses, buffering the video segments, and streaming them to the user can appear as a normal video interaction to the user. Thus, the user can obtain the information needed to complete a purchase and is encouraged to continue to interact with the website for additional purchases.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
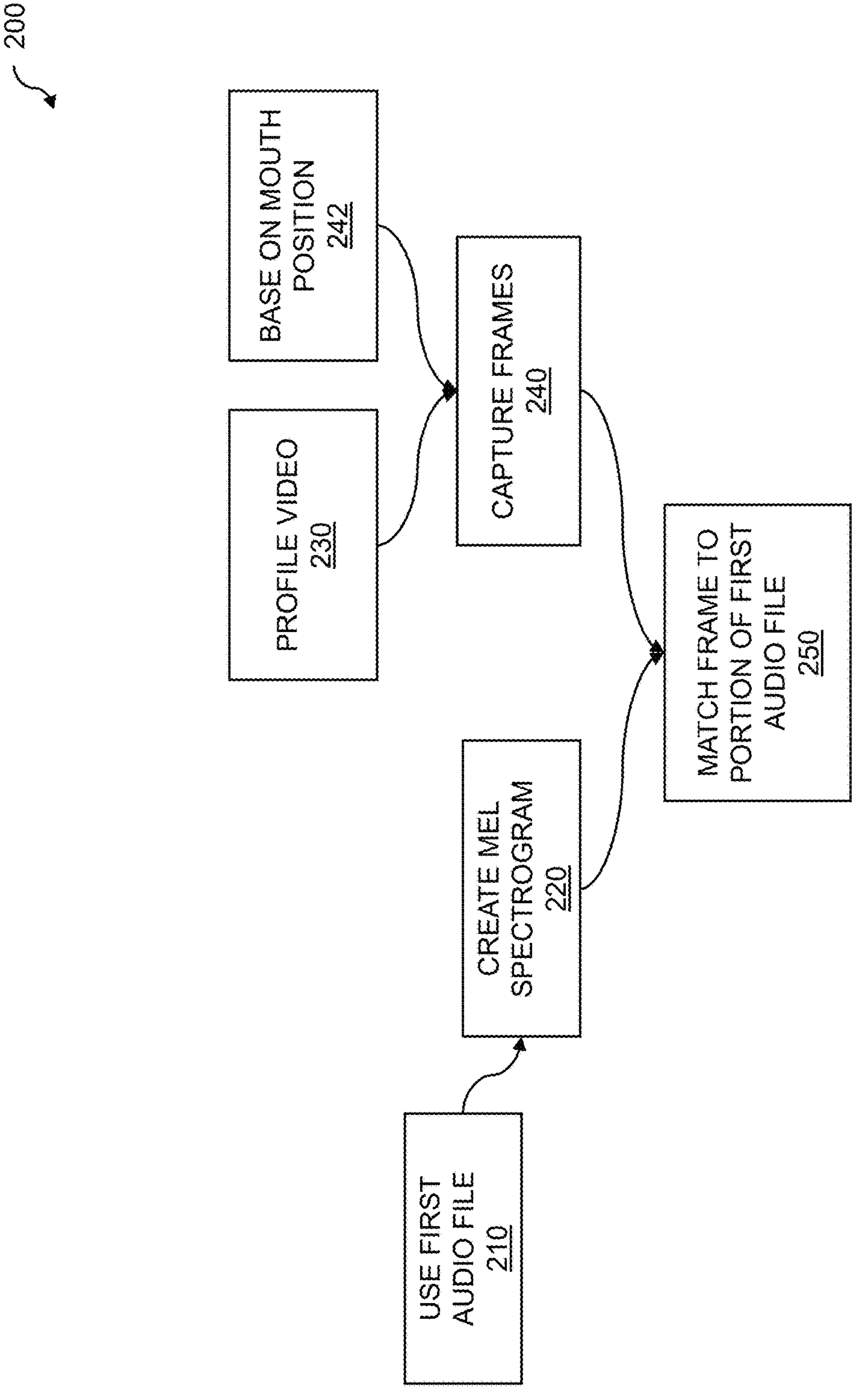
FIG. 2 is a flow diagram for matching frames of a profiled video to a final response.

FIG. 2 is a flow diagram for matching frames of a profiled video to a final response. The flow 200 includes profiling a baseline video 230, wherein the baseline video is based on an avatar, wherein the profiling captures a plurality of frames of the avatar 240, wherein the capturing is based on a mouth position of the avatar 242. The avatar can be a synthetic human host representing the AI virtual assistant. The avatar can be a human. In embodiments, the baseline video can comprise one or more still pictures. The one or more still pictures can be captured from video frames of the avatar. The still pictures can include still photographs of the avatar. In embodiments, the baseline video can include the avatar speaking sounds or phonemes of a language that can be spoken to respond to the user. The baseline video can be separated into groups of captured video frames. Each group of captured video frames can display the avatar speaking one word, sound, or phoneme. Thus, a database of captured video frames of the avatar pronouncing every sound required to produce any word in a language can be stored and used to generate videos of the avatar speaking. The phonemes can be mapped to corresponding face, mouth, lip, and/or eye movements so that as a word is spoken by the avatar, the movement of the mouth, lip, face, and/or eyes correspond.

The flow 200 includes creating 220, from the first audio file 210 within the plurality of audio files, a Mel spectrogram, wherein the Mel spectrogram comprises an audio analysis of the first audio file. A Mel spectrogram can be a graphical representation of the frequency spectrum of a sound over time. The frequency axis of the graphical plot can use a Mel scale. A Mel scale can be the scale of pitches that humans can hear. The Mel spectrogram audio analysis can be used to distinguish spoken words, recognize specific voices, or separate environmental noise from voices. In some embodiments, the audio analysis can be used to distinguish emotional content in the voice of the speaker. In embodiments, the Mel spectrogram audio analysis can be used to distinguish individual words and phonemes that make up words in the first audio file.

The flow 200 includes matching 250, to a first section of the first audio file, a frame of the avatar from the plurality of frames of the avatar, wherein the first section comprises a length of the first audio file divided by a frame rate. In embodiments, the frame rate is 12 frames per second (fps). The frame rate can be 14 fps, 16 fps, 24 fps, 25 fps, 30 fps, 60 fps, 120 fps, and so on. In embodiments, the first audio file can be analyzed using a Mel spectrogram audio analysis and separated into distinct words, sounds, and phonemes. Each phoneme identified in the audio analysis can be used to select a corresponding video frame or group of frames stored in the library of video frames captured from the profiled baseline video. The video frames can then be matched to the audio file based on the Mel spectrogram audio analysis. Each word, sound, or phoneme can be matched to the corresponding video frames of the avatar performing the same word, sound, or phoneme. The video frames of the avatar can enable the animation of the artificial intelligence virtual assistant by a game engine. The result can be a first video segment that can be made up of sequences of video frames performed by the avatar speaking each word of the first audio file in order.

In embodiments, the synchronized first video file can include the AI virtual assistant avatar opening and closing the mouth between each word or phrase of the first audio file in a human-like manner. The facial landmarks of the avatar can be identified and used to capture the muscle movements of the face as words are spoken. The captured video frames can be used to animate the mouth of the avatar so that the beginning and ending of each word match the mouth and lip movements of a human. For example, words that begin with a hard consonant such as "b," "p," or "t" can show the avatar mouth forming those letters to begin a spoken word. Words ending in "ing," "s," or "ed," for example, can show the avatar finishing a spoken word with the same mouth movements that a human uses, then closing the lips prior to beginning the next word. Pauses between words to allow for thinking, giving emphasis, separating sentences, or waiting for a response from the user can show the avatar waiting with a closed mouth.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
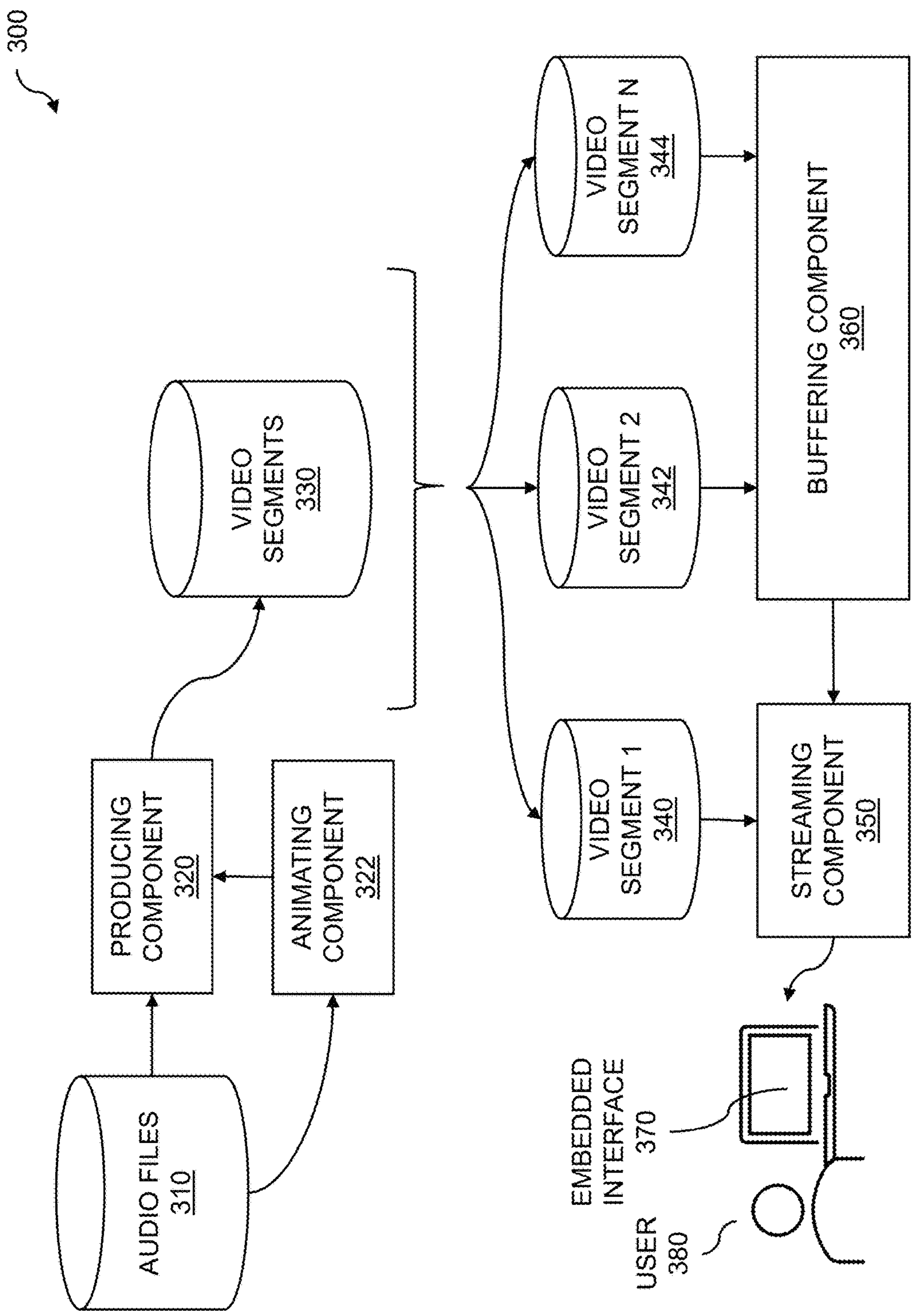
FIG. 3 is an infographic for streaming a segmented artificial intelligence virtual assistant with probabilistic buffering.

FIG. 3 is an infographic for streaming a segmented artificial intelligence virtual assistant with probabilistic buffering. The infographic 300 includes accessing a plurality of audio files 310, wherein each audio file in the plurality of audio files comprises a section of an answer to a user, wherein the answer is related to one or more products for sale, and wherein the answer is based on a large language model. In embodiments, the LLM can be trained with voice and text interactions between users, human sales associates, help desk staff members, product experts, and AI virtual assistants. Information articles and questions covering products and services offered for sale by the website can be included in the LLM database. The information on products can be analyzed by the LLM and used to generate answers to questions and comments related to products and services offered for sale. The answers generated by the LLM can be data streams of text. In embodiments, the text data from the LLM can be converted by a text-to-speech (TTS) converter to an audio file. The text-to-speech converter can include a synthesized voice based on a voiceprint from a human. The synthesized voice can include AI-generated speech. The synthesized voice can be used to perform the one or more text responses to the user created by the LLM. In embodiments, a plurality of audio files can be generated, with each audio file addressing a portion of an answer to one or more questions generated by the user. Each portion of the LLM response can be converted to an audio file by the TTS converter and stored for video segment production.

The infographic 300 includes a producing component 320. The producing component 320 is used in producing a first video segment, wherein the first video segment is based on a first audio file within the plurality of audio files, wherein the producing includes animating an artificial intelligence virtual assistant, wherein the animating is based on the first audio file. In embodiments, the first audio response file generated by the LLM and TTS converter is forwarded to one or more processors that can include 2D and 3D images of the AI virtual assistant and can include a game engine.

The infographic 300 can include an animating component 322. The animating component 322 can include the game engine. The game engine can use one or more 2D and 3D images of the AI virtual assistant to generate animated movements of the virtual assistant. The animating of the AI virtual assistant can include actions of the eyes, mouth, lips, and/or face that mimic human movements speaking words and phrases. The image of the AI virtual assistant can be combined with the synthesized voice performing the audio response generated by the LLM. The game engine can be used to animate the AI virtual assistant. The animating can include profiling a baseline video, wherein the baseline video is based on an avatar, wherein the profiling captures a plurality of frames of the avatar, wherein the capturing is based on a mouth position of the avatar. The baseline video can include the avatar speaking each sound or phoneme of a language that can be used to respond to the user. The baseline video can be separated into groups of video frames with each group displaying the avatar speaking one sound or phoneme. The animating can include creating a Mel spectrogram from the audio files. The Mel spectrogram audio analysis can be used to distinguish individual words and phonemes that make up words in the first audio file. Content of the audio files can then be matched to a video frame that was separated from the baseline video. Each word, sound, or phoneme can be matched to the corresponding video frames of the avatar performing the same word, sound, or phoneme. The result of the animating and the producing can be one or more video segments 330. The video segments can include a first video segment 340, a second video segment 342, and so on, up to an Nth video segment 344. Each video segment can include a performance, of the avatar, speaking the content of the corresponding audio file.

The infographic 300 includes a streaming component 350. The streaming component 350 includes streaming, within an embedded interface 370, the first video segment 340, wherein the streaming the first video segment includes the first audio file. As the frames of the first video segment are produced, they can be streamed immediately to the user 380. The embedded interface 370 can display the assembled video segment performed by the artificial intelligence virtual assistant in a webpage window, a video chat window, a mobile application running on a mobile device, and so on. In embodiments, as the user views the first video segment, he or she can generate additional questions or comments. The additional comments can be captured and forwarded to the LLM to produce additional responses.

The infographic 300 includes creating a second video segment 342, wherein the second video segment is based on a second audio file within the plurality of audio files, wherein the animating includes the second audio file. In embodiments, the production of the second video segment 342 can mimic the process used to produce the first video segment 340. The second audio file can be created using a text-to-speech converter that includes the voice of the artificial intelligence virtual assistant. The second audio files can be analyzed and separated into distinct words, sounds, or phonemes that can be used to select video frames from a library of avatar video frames speaking each word, sound, or phoneme in the second audio file. The selected video frames can be used to animate the AI virtual assistant to create the second video segment 342. In embodiments, the second video segment can be stored in a database of video segments as they are produced.

The infographic 300 includes a buffering component 360. The buffering component 360 is used in buffering a length of the second video segment 342, wherein the length of the second video segment that was buffered is determined by a probabilistic model, wherein the buffering occurs during the streaming the first video segment 340. In embodiments, the buffering can include one or more sections of the second video segment 342. One or more probabilistic models can be used to estimate how much of the second video segment should be buffered to provide a constant viewing experience to the user 380. The probabilistic model can be used to size the buffer appropriately so that it is large enough to contain the buffered video segment. The probabilistic model can be based on multiple factors involved in the production and streaming of the video segments. The probabilistic model can be based on one or more of a producing time, a streaming time, and a network delay. The probabilistic model can be based on the number of questions and comments made by the user, the rate at which user comments are made, the amount of information available on products being presented, the complexity of the AI virtual assistant avatar, the language being used, and so on.

The infographic 300 includes streaming the second video segment, wherein the streaming the second video segment 342 includes the second audio file, wherein the streaming the first video segment 340 is complete. In embodiments, as soon as the first video segment 340 has completed streaming, the second video segment can be copied rapidly from the memory buffers and streamed to the user. As the buffers are freed up from copying one video segment to the streaming process, they can be filled with subsequent video segments produced for the user.

The infographic 300 can further comprise making additional video segments, wherein the Nth video segment 344 is based on an additional audio file within the plurality of audio files, wherein the animating includes the Nth video segment. The making a third, fourth, fifth, and so on to an Nth video segment 344 can further comprise buffering a part of the Nth video segment, as determined by the probabilistic model. As mentioned above and throughout, the user can generate additional questions and comments while interacting with the artificial intelligence virtual assistant. The responses to the user can be long or short, depending on the amount of information required to answer the question. As the LLM generates a third or more responses to the user, the responses can be converted to audio files. The audio files can be used to produce video segments animated and synchronized with the audio segments. As the additional video segments are produced, they can be placed in memory buffers based on the probabilistic model and streamed to the user as soon as the user has viewed the previous video. The entire process of responding to user questions and comments, producing audio and video responses, storing the video segments, and streaming them to the user can continue just as a normal human video chat proceeds. Thus, the user receives the information needed to complete a purchase and is encouraged to continue to interact with the website for additional purchases.

Figure 4:
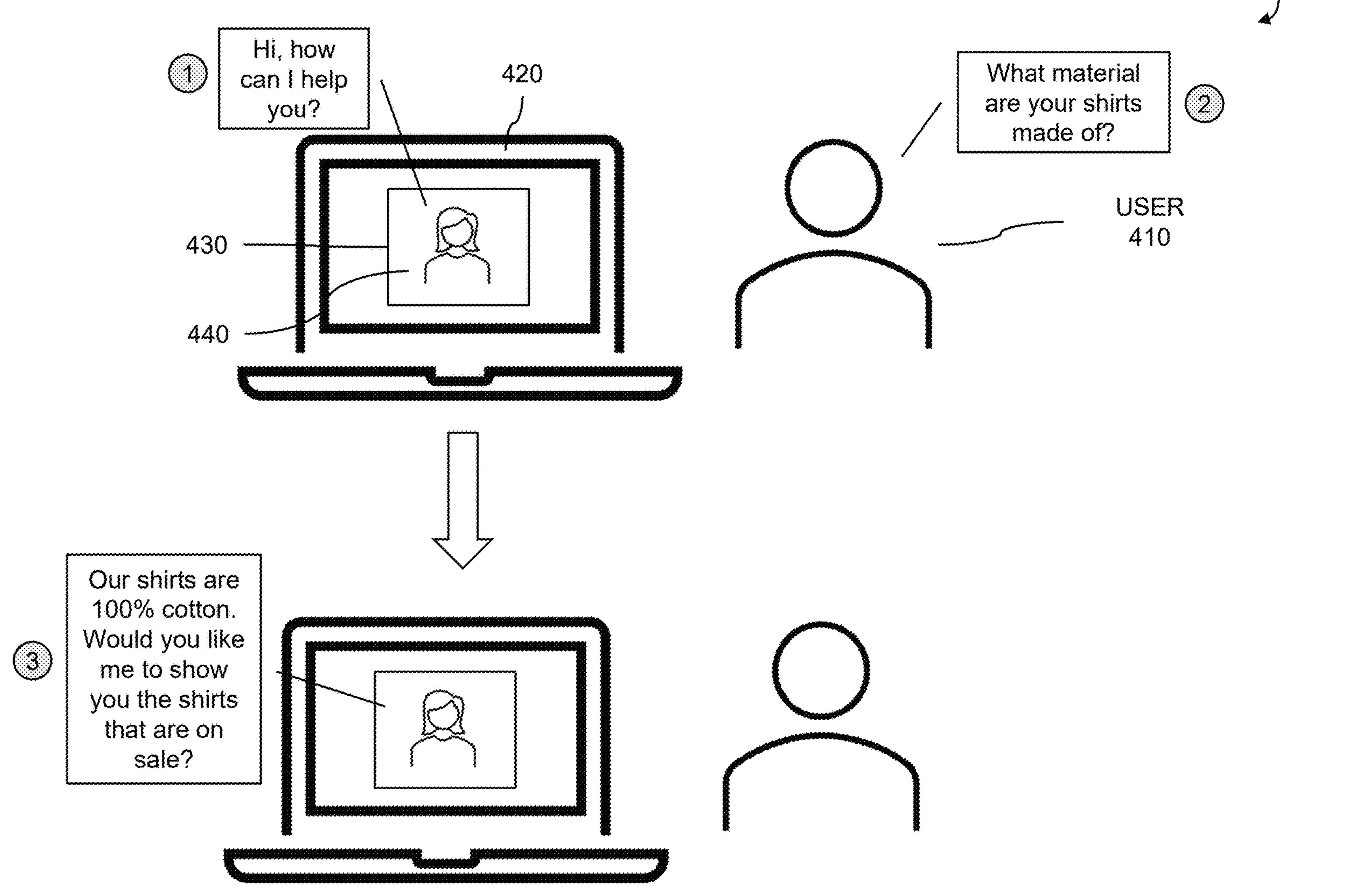
FIG. 4 is an example of an interaction with an artificial intelligence virtual assistant.

FIG. 4 is an example of an interaction with an artificial intelligence virtual assistant. The example 400 is shown in three stages. In stage 1, the example 400 includes requesting, by a user 410, an interaction, wherein the interaction is based on a product for sale within the one or more products for sale. The user accesses a website with products for sale via an embedded interface 420. The embedded interface recognizes a user request for an interaction, based on the user clicking on a help button, asking for more information in a video or audio chat, asking a question in a text box, etc. In some embodiments, information about the user is collected based on previous user interactions with the website, demographic data available from the video chat, social media platforms, search engine information, and so on. An AI machine learning model uses the user information to select a synthetic human host 440 to interact with the user 410 through a first video segment 430 displayed in the embedded interface 420. In the example 400, the synthetic human host is shown saying, “Hi, how can I help you?”

In stage 2 of the example 400, the user 410 responds to the synthetic human host in the first video segment with a question, “What material are your shirts made of?” The example 400 includes collecting, by the embedded interface 420, the user audio input. The user input, for example, the question about shirt material, is collected by an AI machine learning model that includes a large language model (LLM) that uses natural language processing (NLP). In some embodiments, the AI machine learning model analyzes the user input and generates a response based on information articles contained in a Stanford Question Answering Dataset (SQuAD). The SQuAD can be formatted to contain hundreds of questions and answers generated from the information articles on products and services offered for sale on the website. The AI machine learning model can analyze the question asked by the user and select the best response based on the product information stored in the dataset.

The example 400 includes creating, by an LLM, a response to the interaction with the user. In stage 3 of the example 400, the LLM generates a text response to the user question. The response is, "Our shirts are 100% cotton. Would you like me to show you the shirts that are on sale?" The entire text response is generated using the same voice of the synthetic human used in the first video segment (Stage 1) to create an audio stream. In embodiments, the audio stream can be edited to include pauses, speaking errors, accents, idioms, and so on to make the audio sound as natural as possible. The audio stream can be separated into segments based on the natural auditory cadence of the stream. Each segment is used to generate a video clip of the synthetic human host performing the audio segment. The audio segments are sent to one or more separate processors so that each video clip can be generated quickly and reassembled in order to be presented to the user. In embodiments, the video clips can be produced and presented to the user as additional clips are being generated. The user 410 can respond to the second video clip with additional questions, comments, and so on. For example, the user in the example 400 can say, "Yes, please do." The AI machine learning model can then collect the response from the user and display the shirts on sale from the website. Additional videos of the synthetic human discussing additional details of the shirts; informing the user about matching clothing items such as pants, jackets, accessories, and so on can be generated.

Figure 5:
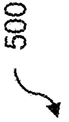
FIG. 5 is an example of an AIVA showing a short-form video.
Figure 5:
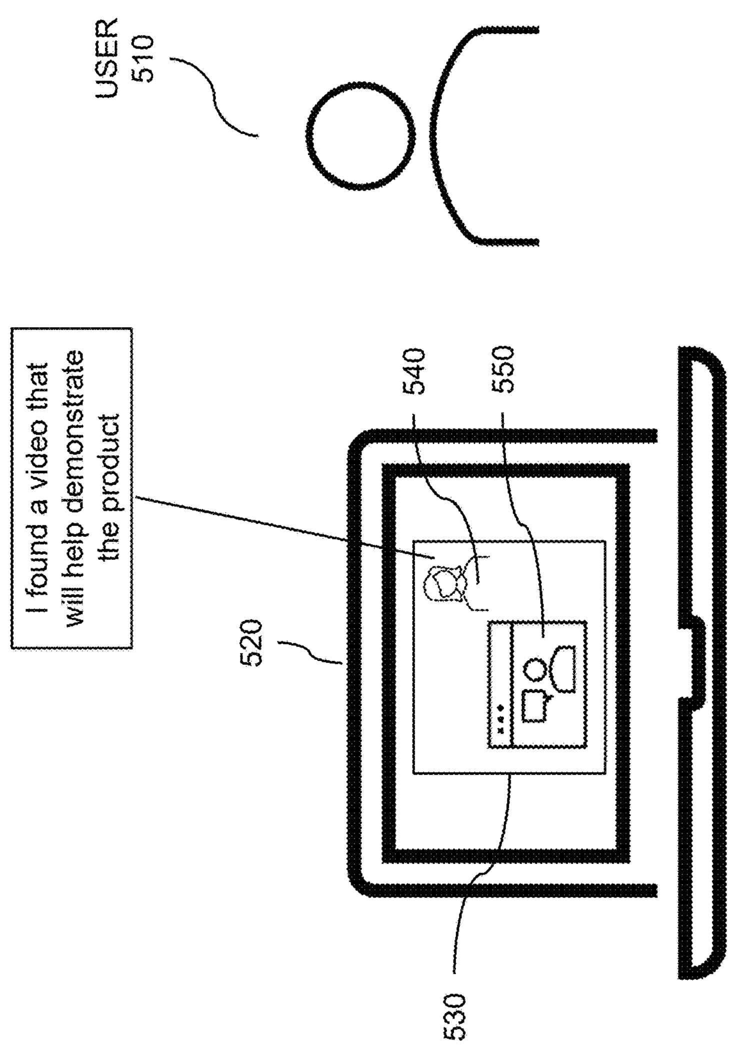

FIG. 5 is an example of an artificial intelligence virtual assistant (AIVA) showing a short-form video. The example 500 includes a device 520 with an embedded interface for displaying a first video segment 530, wherein the first video segment includes a synthetic human host 540. The first video segment 530 can include a short-form video 550 presented by the synthetic human host 540. As described above and throughout, the embedded interface includes an artificial intelligence virtual assistant, wherein the artificial intelligence virtual assistant comprises a synthetic human host 540, wherein the audio input from the user relates to one or more products for sale. In embodiments, the user input can be captured by an NLP engine and analyzed by one or more LLMs, and a final response to the user input can be generated. In embodiments, the final response can include one or more short-form videos that relate to a product or service in which the user is interested. Product demonstrations, livestreams, product expert reviews, social media influencer videos, and so on can be accessed by the LLM and can be included in the final response to the user. In embodiments, the LLM final response includes pointers, URLs, etc. to reference and access the short-form videos.

The example 500 includes producing a final video segment, wherein the producing includes animating the artificial intelligence virtual assistant. In embodiments, the final video segment includes the short-form video 550 included by the LLM in the final response to the user. The LLM final response includes text to introduce and explain the short-form video that is included. In the example 500, the synthetic human host 540 is saying, "I found a video that will help demonstrate the product." The short-form video 550 can be seen along with the synthetic human host as the video plays the product demonstration for the user. In embodiments, as the short-form video plays, user input can be captured, analyzed by the LLM, and used to generate additional dialogue for the synthetic human host. For example, the user 510 may ask about pricing or delivery times for the product as the demonstration short-form video plays. The embedded interface can capture the user questions, forward them to the NLP, convert them to text, analyze the text with the LLM, generate an answer, convert the text of the LLM response to video, and insert the video of the synthetic human host into the video segment 530 so that the host can respond to the user question as the demonstration video continues to play. In embodiments, an ecommerce environment can be included in the video segment so that the user can purchase products as the video continues to play.

Figure 6:
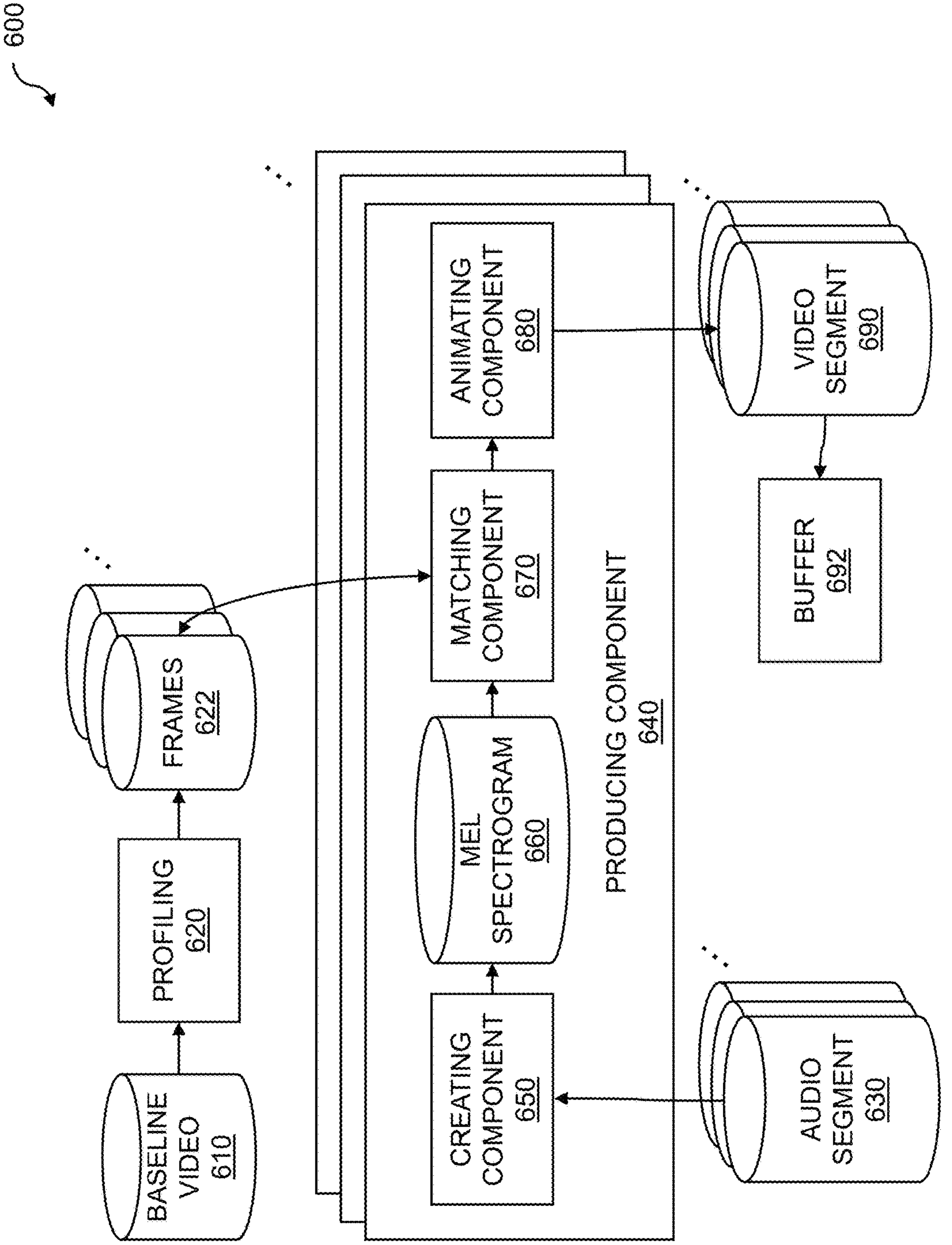
FIG. 6 is an infographic for producing a video.

FIG. 6 is an infographic for producing a video. The infographic 600 can include profiling a baseline video 610, wherein the baseline video is based on an avatar, wherein the profiling 620 captures a plurality of frames of the avatar 622, wherein the capturing is based on a mouth position of the avatar. In embodiments, the baseline video can comprise one or more still pictures. The still pictures can be captured from video or film frames. The still pictures can be still photographs. In embodiments, the avatar can be a human. The avatar can be generated by an AI model engine based on 2D or 3D scans of a human. In embodiments, the avatar can be the AI virtual assistant.

In embodiments, the baseline video can include the avatar speaking each word, sound, or phoneme of a language that can be used to respond to the user. A phoneme is a discrete sound that is associated with a letter or a combination of letters of the alphabet. The video of the avatar speaking can be analyzed to identify the characteristics of the speaker's voice, facial expressions, and/or body language. This analysis can be used to create a profile of the speaker, which can then be used to generate more realistic and accurate animations of the avatar. For example, if the speaker has a particular accent or mannerism, this information can be used to create a more authentic avatar. The baseline video can be separated into discrete groups of video frames displaying the avatar speaking one sound or phoneme. Thus, a database of video frames of the avatar pronouncing every sound required to produce any word in a language can be stored and used to generate videos of the avatar speaking. The phonemes can be mapped to corresponding face, mouth, lip, and/or eye movements so that as a word is spoken by the avatar, the movement of the mouth, lip, face, and/or eyes correspond.

The infographic 600 includes a producing component 640. The producing component 640 can be used to produce a first video segment, wherein the first video segment is based on a first audio file within the plurality of audio segment files, wherein the producing includes animating an artificial intelligence virtual assistant, wherein the animating is based on the first audio file. The producing component 640 can include a creating component 650. The creating component 650 can comprise creating, from the first audio file within the plurality of audio segment files 630, a Mel spectrogram 660, wherein the Mel spectrogram can comprise an audio analysis of the first audio file. A Mel spectrogram can be a graphical representation of the frequency spectrum of a sound over time. The frequency axis of the graphical plot can use a Mel scale. A Mel scale can be the scale of pitches that humans can hear. The Mel spectrogram audio analysis can be used to distinguish spoken words, recognize specific voices, separate environmental noise from voices, and so on. In some embodiments, the audio analysis can be used to distinguish emotional content in the voice of the speaker. In embodiments, the Mel spectrogram audio analysis is used to distinguish individual words and phonemes that make up words in the first audio file.

The infographic 600 can include a matching component 670. The matching component 670 can be used to match, to a first section of the first audio file, a frame of the avatar from the plurality of frames of the avatar, wherein the first section comprises a length of the first audio file divided by a frame rate. In embodiments, the frame rate is 12 frames per second (fps). In other embodiments, the frame rate can be 14 fps, 16 fps, 24 fps, 25 fps, 30 fps, 60 fps, 120 fps, and so on. In embodiments, the first audio file can be analyzed using a Mel spectrogram 660 audio analysis and can be separated into distinct words, sounds, and/or phonemes. Each phoneme identified in the audio analysis can be used to select a corresponding video frame or group of frames stored in the library of video frames captured from the profiled baseline video. The video frames can then be matched to the audio file based on the Mel spectrogram audio analysis. Each word, sound, or phoneme can be matched to the corresponding video frames of the avatar performing the same word, sound, or phoneme. The result is a first video segment made up of sequences of video frames performed by the avatar speaking each word of the first audio file in order.

The infographic 600 includes an animating component 680. The animating component 680 can be used to animate the video segments so that the movements of the AI virtual assistant appear human. In embodiments, a game engine included in the producing component 640 can be used to animate the AI virtual assistant. The game engine can use one or more 2D and 3D images of the AI virtual assistant to build a human-like 3D model of the AI virtual assistant. The game engine can be used to animate detailed features of the AI virtual assistant head, face, and body. The game engine animating can include actions of the eyes, mouth, lips, and/or face that mimic human movements speaking words and phrases. The image of the AI virtual assistant can be combined with the synthesized voice and can be used to animate the AI virtual assistant and produce a first video segment of one or more video segments 690 of the synthetic human performing the first audio segment of one or more audio segments. As each video segment is completed, it can be stored in a database or memory buffer 692 in preparation for streaming to the user.

Figure 7:
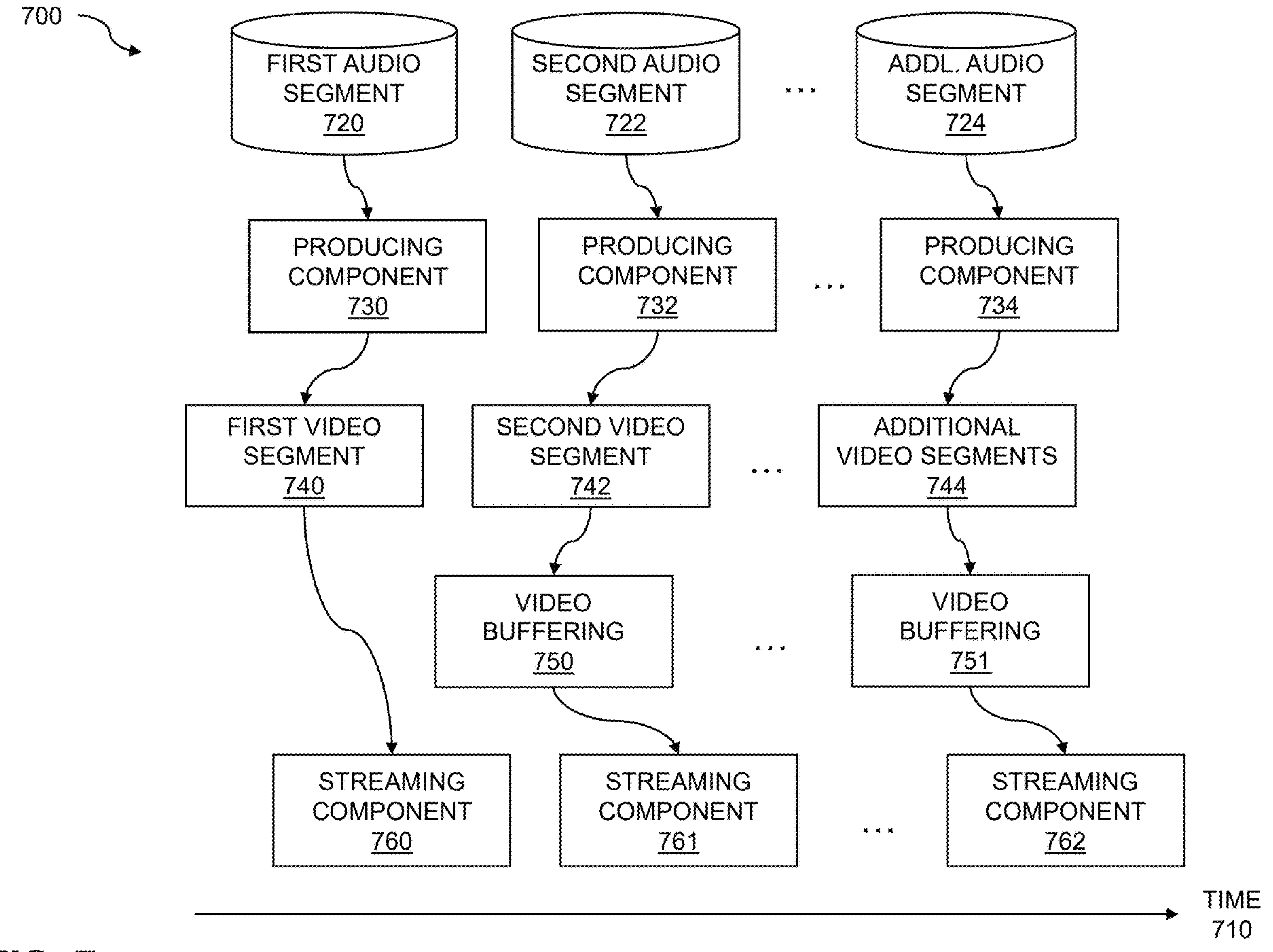
FIG. 7 is an infographic for video streaming.

FIG. 7 is an infographic for video streaming. The infographic 700 includes producing 730 a first video segment, wherein the first video segment 740 is based on a first audio segment 720 within the plurality of audio segment files, wherein the producing includes animating an artificial intelligence virtual assistant, wherein the animating is based on the first audio file. In embodiments, a second video segment 742 can be produced, wherein the second video segment is based on a second audio segment 722 within the plurality of audio files, wherein the animating includes the second audio segment 722. The producing component 732, as described above and throughout, can analyze the second audio segment 722; select video frames from a library of video frames matching the words, sounds, and/or phonemes included in the second audio segment; and assemble the video frames into a second video segment 742. The producing component can include a game engine. As additional audio segment files 724 are created, corresponding video segments can be produced 734. As time progresses 710, additional video segments 744 can be generated in response to user questions and comments. The audio segments 720, 722, 724 can be separate parts of a larger response by the LLM to answer a question posed by the user. Some audio segments can be direct answers to simple questions or comments made by the user. As the interaction between the artificial intelligence virtual assistant and the user progresses, additional answers which include additional audio segments can be generated to continue the interaction in the same way that a human audio or video chat progresses.

The infographic 700 includes one or more streaming components such as streaming components 760, 761, and 762. The streaming components can include streaming, within an embedded interface, the first video segment, wherein the streaming the first video segment includes the first audio segment. As the frames of the first video segment 740 are produced 730, they can be sent directly to streaming component 760 and presented immediately to the user. The embedded interface can display the assembled video segment performed by the artificial intelligence virtual assistant in a webpage window, video chat window, a mobile application running on a mobile device, and so on.

The infographic 700 includes buffering 750 a length of the second video segment, wherein the length of the second video segment that was buffered is determined by a probabilistic model, wherein the buffering occurs during the streaming the first video segment. In embodiments, the buffering can include one or more sections of the second video segment. The buffering can occur during the streaming the first video by streaming component 760. While the second video segment 742, buffered by video buffering 750, is being streamed by streaming component 761, an additional, subsequent video segment 744 can be buffered by video buffering 751 prior to subsequent streaming by streaming component 762. The advantage of placing the second and subsequent video segment data in memory buffers is that the user does not have to wait for an entire response from the LLM to be produced before starting to receive an answer when the first video segment is streamed. Additional video segments can then be streamed from streaming component 762 out of video buffering 751 to the user as if the user were watching a single video stream that answers their question.

In embodiments, the length of the second video segment 742 that was buffered can be determined by a probabilistic model. The probabilistic model can be based on multiple factors involved in the production and streaming of the video segments. The probabilistic model can be based on one or more of a producing time, a streaming time, and a network delay. The probabilistic model can be based on the number of questions and comments made by the user, the rate at which user comments are made, the amount of information available on products being presented, the complexity of the AI virtual assistant avatar, the language being used, and so on. In embodiments, the aforementioned process is repeated for every audio segment. As the user views all the video segments that were produced and streamed, additional questions or comments may come to mind. The artificial intelligence virtual assistant can capture subsequent user input, and the LLM processing, TTS converting, video producing, buffering, and streaming can be repeated. The user can continue to interact with the AI virtual assistant, generating additional input collected by the embedded interface. Note that the producing components, video buffering, and streaming components can all be reused, reallocated, shuffled, reordered, repurposed, and so on, so as to best meet the needs of the overall process flow and the priorities of allocation and efficient use of the resources.

Figure 8:
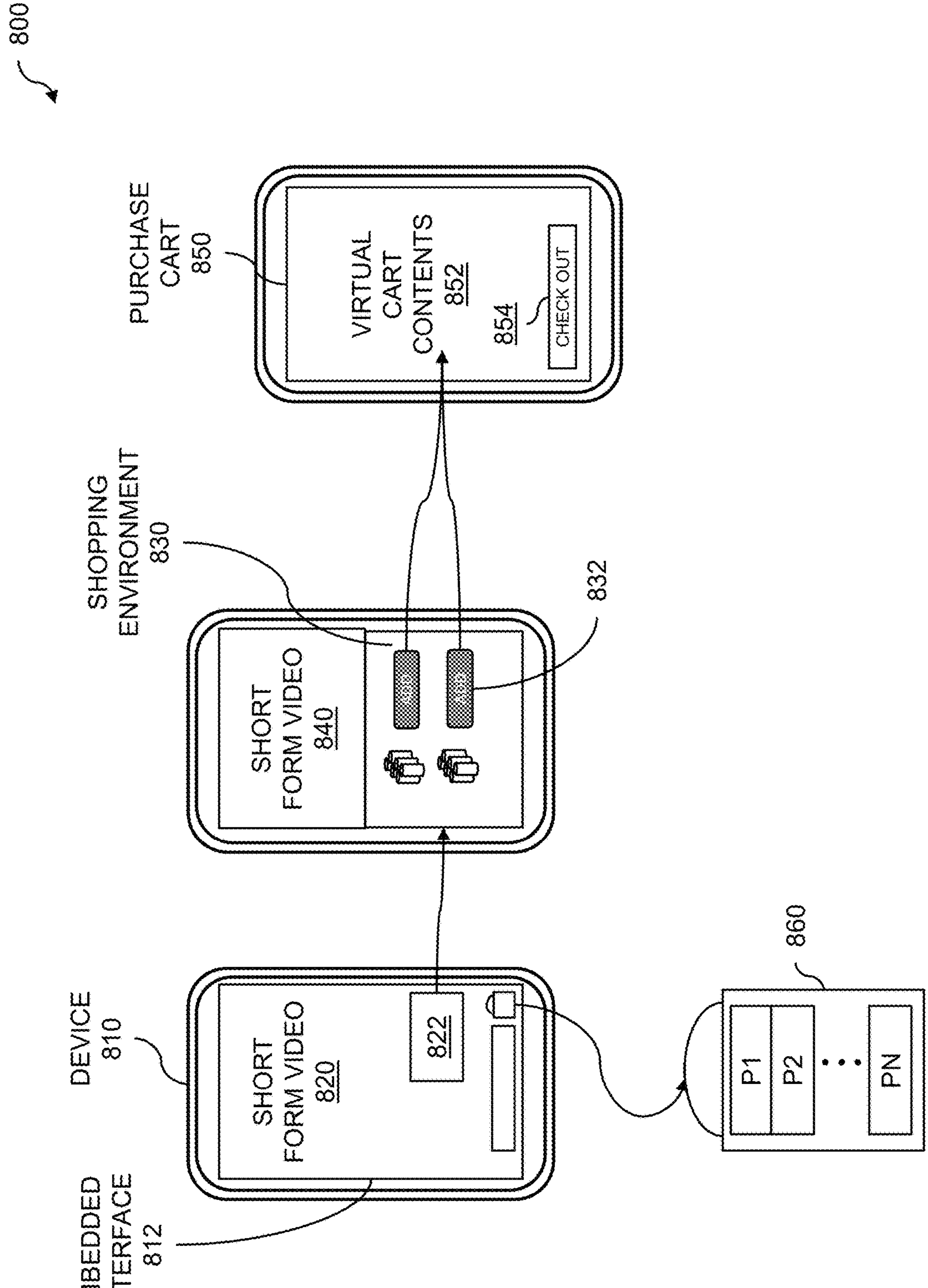
FIG. 8 is an example of an ecommerce purchase.

FIG. 8 is an example of an ecommerce purchase. As described above and throughout, a user can interact with an artificial intelligence virtual assistant regarding items for sale. In the example 800, the interaction can be enabled by an embedded interface 812. The embedded interface can be included on a device 810. The device 810 can be a smart TV which can be directly attached to the Internet; a television connected to the Internet via a cable box, TV stick, or game console; an Over-the-Top (OTT) device such as a mobile phone, laptop computer, tablet, pad, or desktop computer; etc. The interaction can include one or more answers generated by the LLM which can be produced into one or more video segments to be displayed. During the interaction, a first video segment in the one or more video segments can be streamed to the user, as well as a second video segment in the one or more video segments. In embodiments, the streaming the first video segment and the streaming the second video segment comprise a short-form video. The short-form video 820 can include a separate window that demonstrates a product for sale while the artificial intelligence virtual assistant, which can comprise one or more streamed video segments, is shown in the embedded interface. Thus, the user can obtain an answer to his question as well as a demonstration of the product for sale. In embodiments, the short-form video can be viewed in real time or replayed at a later time. In embodiments, the accessing the short-form video on the device via the embedded interface can be accomplished using a browser, mobile application, or another application running on the device.

The example 800 can include generating and revealing a product card 822 on the device 810. In embodiments, the product card represents at least one product available for purchase while the short-form video plays. Embodiments can include inserting a representation of the first object into the on-screen product card. A product card is a graphical element such as an icon, thumbnail picture, thumbnail video, symbol, or other suitable element that is displayed in front of the short-form video. The product card is selectable via a user interface action such as a press, swipe, gesture, mouse click, verbal utterance, or other suitable user action. The product card 822 can be inserted when the short-form video 820 is visible. When the product card is invoked, an in-frame shopping environment 830 can be rendered over a portion of the short-form video while the short-form video continues to play. This rendering enables an ecommerce purchase 832 by a user while preserving a continuous short-form video playback session. In other words, the user is not redirected to another site or portal that causes the short-form video playback to stop. Thus, viewers are able to initiate and complete a purchase completely inside of the short-form video playback user interface, without being directed away from the currently playing short-form video. Allowing the short-form video event to play during the purchase can enable improved audience engagement, which can lead to additional sales and revenue, one of the key benefits of disclosed embodiments. In some embodiments, the additional on-screen display that is rendered upon selection or invocation of a product card conforms to an Interactive Advertising Bureau (IAB) format. A variety of sizes are included in IAB formats, such as for a smartphone banner, mobile phone interstitial, and the like.

The example 800 can include rendering an in-frame shopping environment 830. The rendering can enable a purchase of the at least one product for sale by the viewer, wherein the ecommerce purchase is accomplished within the short-form video window 840. The short-form video window can be enabled by the embedded interface 812. In embodiments, the short-form video window can include a real time short-form video, a prerecorded short-form video segment, a livestream, a livestream replay, one or more video segments comprising an answer from an artificial intelligence virtual assistant, and so on. The short-form window can include any combination of the aforementioned options. The enabling can include revealing a virtual purchase cart 850 that supports checkout 854 of virtual cart contents 852, including specifying various payment methods, and application of coupons and/or promotional codes. In some embodiments, the payment methods can include fiat currencies such as United States dollar (USD), as well as virtual currencies, including cryptocurrencies such as Bitcoin. In some embodiments, more than one object (product) can be highlighted and enabled for ecommerce purchase. In embodiments, when multiple items 860 are purchased via product cards during the short-form video, the purchases are cached until termination of the short-form video, at which point the orders are processed as a batch. The termination of the short-form video can include the user stopping playback, the user exiting the video window, the short-form video ending, or a prerecorded short-form video ending. The batch order process can enable a more efficient use of computer resources, such as network bandwidth, by processing the orders together as a batch instead of processing each order individually.

Embodiments include enabling an ecommerce purchase, within the short-form video, of the one or more products for sale. In other embodiments, the ecommerce purchase includes a representation of the one or more products for sale in an on-screen product card. In some embodiments, the enabling the ecommerce purchase includes a virtual purchase cart. In further embodiments, the virtual purchase cart covers a portion of the short-form video.

Figure 9:
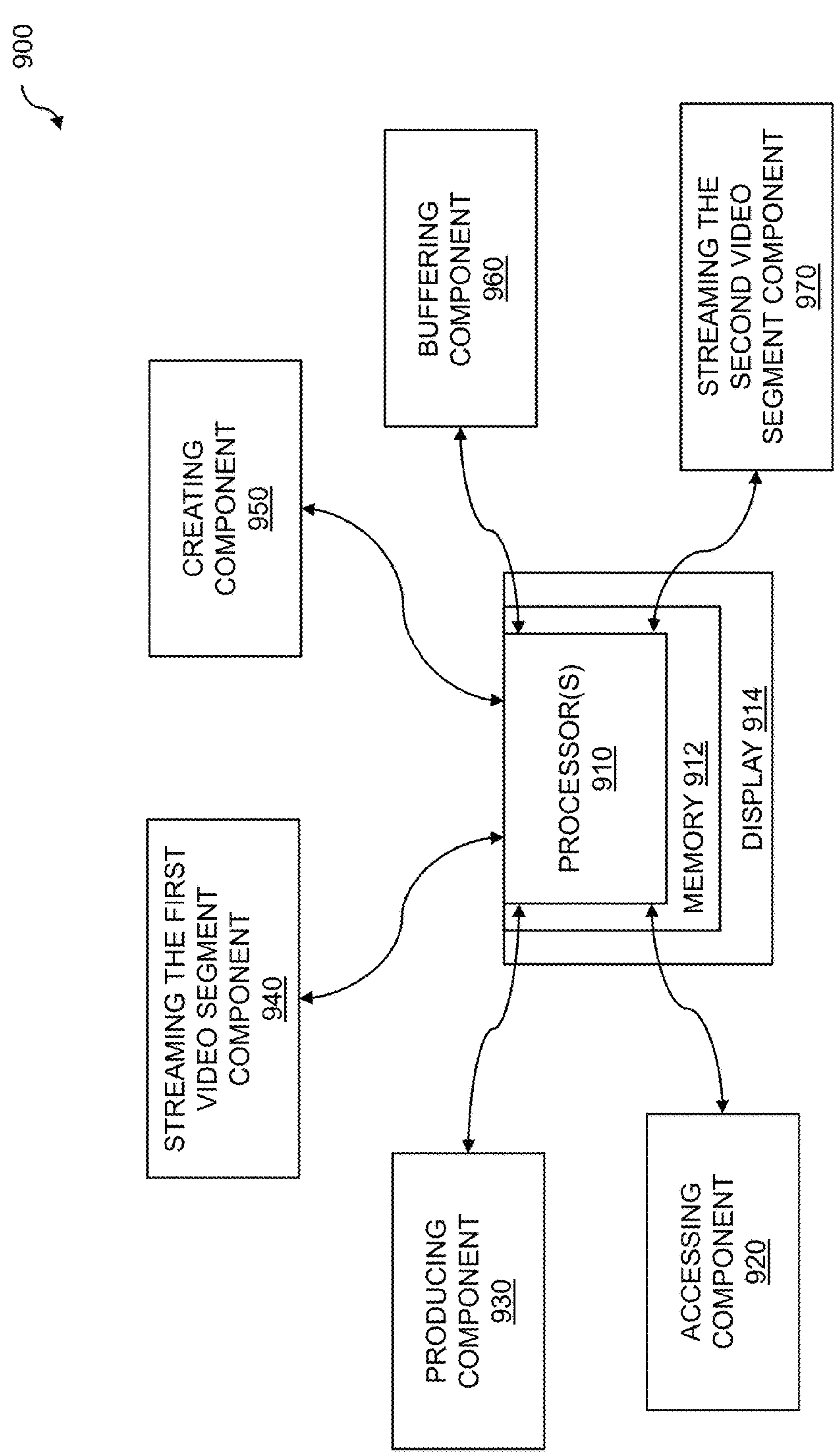
FIG. 9 is a system diagram for streaming a segmented artificial intelligence virtual assistant with probabilistic buffering.

FIG. 9 is a system diagram for a segmented artificial intelligence virtual assistant with probabilistic buffering. The system 900 can include one or more processors 910 coupled to a memory 912 which stores instructions. The system 900 can include a display 914 coupled to the one or more processors 910 for displaying data, video streams, videos, video metadata, synthesized images, synthesized image sequences, synthesized video search results, sorted search results, search parameters, metadata, webpages, intermediate steps, instructions, and so on. In embodiments, one or more processors 910 are coupled to the memory 912 where the one or more processors, when executing the instructions which are stored, are configured to: access a plurality of audio files, wherein each audio file in the plurality of audio files comprises a section of an answer to a user, wherein the answer is related to one or more products for sale, and wherein the answer is based on a large language model; produce a first video segment, wherein the first video segment is based on a first audio file within the plurality of audio files, wherein the producing includes animating an artificial intelligence virtual assistant, wherein the animating is based on the first audio file; stream, within an embedded interface, the first video segment, wherein the streaming the first video segment includes the first audio file; create a second video segment, wherein the second video segment is based on a second audio file within the plurality of audio files, wherein the animating includes the second audio file; buffer a length of the second video segment, wherein the length of the second video segment that was buffered is determined by a probabilistic model, wherein the buffering occurs during the streaming the first video segment; and stream the second video segment, wherein the streaming the second video segment includes the second audio file, wherein the streaming the first video segment is complete.

The system 900 includes an accessing component 920. The accessing component 920 includes functions and instructions for accessing a plurality of audio files, wherein each audio file in the plurality of audio files comprises a section of an answer to a user, wherein the answer is related to one or more products for sale, and wherein the answer is based on a large language model (LLM). In embodiments, the LLM can be trained with voice and text interactions between users, human sales associates, help desk staff members, product experts, and AI virtual assistants. The LLM can be trained with product information. Information articles and questions covering products and services offered for sale by the website can be included in the LLM database. The information on products can be analyzed by the LLM and used to generate answers to questions and comments related to products and services offered for sale. Some user questions can elicit simple LLM responses that require only a few words. Other user queries can require several paragraphs of information. In response, the LLM can generate multiple statements of information which can be separated into discrete audio files for processing by a producing component. The answers generated by the LLM can be data streams of text.

In embodiments, the text data from the LLM can be converted by a text-to-speech (TTS) converter to an audio file. The text-to-speech converter can include a synthesized voice based on a voiceprint from a human. The synthesized voice can include AI-generated speech. The synthesized voice can be used to perform the one or more text responses to the user created by the LLM. In embodiments, a plurality of audio files is generated, with each audio file addressing a portion of an answer to one or more questions generated by the user. Each portion of the LLM response can be converted to an audio file by the TTS converter and stored for video segment production.

The system 900 includes a producing component 930. The producing component 930 includes functions and instructions for producing a first video segment, wherein the first video segment is based on a first audio file within the plurality of audio files, wherein the producing includes animating an artificial intelligence virtual assistant, wherein the animating is based on the first audio file. In embodiments, the first audio response generated by the LLM and TTS converter can be forwarded to one or more processors that can include 2D and 3D images of the AI virtual assistant and can include a game engine. The game engine can use one or more 2D and 3D images of the AI virtual assistant to generate animated movements of the virtual assistant. The AI virtual assistant animation can include actions of the eyes, mouth, lips, and face that mimic human movements speaking words and phrases. The image of the AI virtual assistant can be combined with the synthesized voice and used to animate the AI virtual assistant and produce a first video segment of the synthetic human performing the first audio segment.

The system 900 includes a streaming component 940. The streaming component 940 includes functions and instructions for streaming, within an embedded interface, the first video segment, wherein the streaming the first video segment includes the first audio file. As the frames of the first video segment are produced, they can be streamed immediately to the user. The embedded interface can display the assembled video segment performed by the AI virtual assistant in a webpage window, video chat window, etc.

The system 900 includes a creating component 950. The creating component 950 includes functions and instructions for creating a second video segment, wherein the second video segment is based on a second audio file within the plurality of audio files, wherein the animating includes the second audio file. In embodiments, the production of the second video segment can match the process used to produce the first video segment. The second LLM text response to a user question can be used to create a second audio segment. The second audio segment can be created using a text-to-speech converter that includes the voice of the AI virtual assistant. The second audio segment can be analyzed and separated into distinct sounds or phonemes that can be used to select groups of video frames from a library of avatar video frames speaking each sound or phoneme in the second audio file. The AI virtual assistant can be the avatar in the library of avatar video frames. The selected video frames can be assembled and synchronized to create the second video segment. The synchronizing includes the second audio file and the second video segment.

The system 900 includes a buffering component 960. The buffering component 960 includes functions and instructions for buffering a length of the second video segment, wherein the length of the second video segment that was buffered is determined by a probabilistic model, wherein the buffering occurs during the streaming the first video segment. In embodiments, the buffering can include one or more sections of the second video segment. The buffering can occur during the streaming the first video. In embodiments, the production of the second, third, and so on video segments can be completed more quickly than the user can view and interact the preceding streaming videos. The advantage of placing the second and subsequent video segment data in memory buffers is that it allows these video segments to be streamed to the user as quickly as possible when called for. Buffering also allows the second and subsequent video data segments to be produced and stored in buffers, while the user is viewing earlier segments.

In embodiments, the length of the second video segment that was buffered can be determined by a probabilistic model. The probabilistic model can be based on multiple factors involved in the production and streaming of the video segments. The probabilistic model can be based on one or more of a producing time, a streaming time, and a network delay. The probabilistic model can be based on the number of questions and comments made by the user, the rate at which user comments are made, the amount of information available on products being presented, the complexity of the AI virtual assistant avatar, the language being used, and so on.

The system 900 includes a streaming component 970. The streaming component 970 includes functions and instructions for streaming the second video segment, wherein the streaming the second video segment includes the second audio file, wherein the streaming the first video segment is complete. In embodiments, as soon as the first video segment has completed streaming, the second video segment is copied rapidly from the memory buffers and streamed to the user. As the buffers are freed up from copying one video segment to the streaming process, they can be filled with subsequent video segments produced for the user.

The system 900 can further comprise making a third video segment, wherein the third video segment is based on a third audio file within the plurality of audio files, wherein the animating includes the third video segment. The making a third video segment can further comprise buffering a part of the third video segment, wherein the part of the third video segment is determined by the probabilistic model. As mentioned above and throughout, the user can generate additional questions and comments while interacting with the artificial intelligence virtual assistant. The responses to the user can be long or short, depending on the amount of information required to answer the question. As the LLM generates a third or more responses to the user, the responses can be converted to audio segments. The audio segments can be used to produce video segments synchronized with the audio segments. As the third and subsequent video segments are produced, they can be placed in memory buffers based on the probabilistic model and streamed to the user as soon as the user has viewed the previous video. The entire process of responding to user questions and comments, producing audio and video responses, storing the video segments, and streaming them to the user can continue just as a normal human video chat proceeds. Thus, the user gets the information needed to complete a purchase and is encouraged to continue to interact with the website for additional purchases.

The system 900 can include a computer program product embodied in a non-transitory computer readable medium for searching, the computer program product comprising code which causes one or more processors to perform operations of: accessing a plurality of audio files, wherein each audio file in the plurality of audio files comprises a section of an answer to a user, wherein the answer is related to one or more products for sale, and wherein the answer is based on a large language model; producing a first video segment, wherein the first video segment is based on a first audio file within the plurality of audio files, wherein the producing includes animating an artificial intelligence virtual assistant, wherein the animating is based on the first audio file; streaming, within an embedded interface, the first video segment, wherein the streaming the first video segment includes the first audio file; creating a second video segment, wherein the second video segment is based on a second audio file within the plurality of audio files, wherein the animating includes the second audio file; buffering a length of the second video segment, wherein the length of the second video segment that was buffered is determined by a probabilistic model, wherein the buffering occurs during the streaming the first video segment; and streaming the second video segment, wherein the streaming the second video segment includes the second audio file, wherein the streaming the first video segment is complete.

The system 900 can include a computer system for searching comprising: a memory which stores instructions; one or more processors coupled to the memory, wherein the one or more processors, when executing the instructions which are stored, are configured to: access a plurality of audio files, wherein each audio file in the plurality of audio files comprises a section of an answer to a user, wherein the answer is related to one or more products for sale, and wherein the answer is based on a large language model; produce a first video segment, wherein the first video segment is based on a first audio file within the plurality of audio files, wherein the producing includes animating an artificial intelligence virtual assistant, wherein the animating is based on the first audio file; stream, within an embedded interface, the first video segment, wherein the streaming the first video segment includes the first audio file; create a second video segment, wherein the second video segment is based on a second audio file within the plurality of audio files, wherein the animating includes the second audio file; buffer a length of the second video segment, wherein the length of the second video segment that was buffered is determined by a probabilistic model, wherein the buffering occurs during the streaming the first video segment; and stream the second video segment, wherein the streaming the second video segment includes the second audio file, wherein the streaming the first video segment is complete.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagram and flow diagram illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video streaming comprising:

accessing a plurality of audio files, wherein each audio file in the plurality of audio files comprises a section of an answer to a user, wherein the answer is related to one or more products for sale, and wherein the answer is based on a large language model;

producing a first video segment, wherein the first video segment is based on a first audio file within the plurality of audio files, wherein the producing includes animating an artificial intelligence virtual assistant, wherein the animating is based on the first audio file;

streaming, within an embedded interface, the first video segment, wherein the streaming the first video segment includes the first audio file;

creating a second video segment, wherein the second video segment is based on a second audio file within the plurality of audio files, wherein the animating includes the second audio file;

buffering a length of the second video segment, wherein the length of the second video segment that was buffered is determined by a probabilistic model, wherein the buffering occurs during the streaming the first video segment; and streaming the second video segment, wherein the streaming the second video segment includes the second audio file, wherein the streaming the first video segment is complete.

2. The method of claim 1 wherein the probabilistic model is based on one or more of a producing time, a streaming time, and a network delay.

3. The method of claim 1 further comprising making a third video segment, wherein the third video segment is based on a third audio file within the plurality of audio files, wherein the animating includes the third video segment.

4. The method of claim 3 further comprising buffering a part of the third video segment, wherein the part of the third video segment is determined by the probabilistic model.

5. The method of claim 1 further comprising profiling a baseline video, wherein the baseline video is based on an avatar, wherein the profiling captures a plurality of frames of the avatar, wherein the capturing is based on a mouth position of the avatar.

6. The method of claim 5 wherein the baseline video comprises one or more still pictures.

7. The method of claim 5 wherein the avatar is a human.

8. The method of claim 7 further comprising creating, from the first audio file within the plurality of audio files, a Mel spectrogram, wherein the Mel spectrogram comprises an audio analysis of the first audio file.

9. The method of claim 8 further comprising matching, to a first section of the first audio file, a frame of the avatar from the plurality of frames of the avatar, wherein the first section comprises a length of the first audio file divided by a frame rate.

10. The method of claim 9 wherein the frame rate is 12 frames per second (fps).

11. The method of claim 9 wherein the animating includes the frame of the avatar that was matched.

12. The method of claim 11 wherein the matching is based on a second section of the first audio file.

13. The method of claim 1 further comprising synchronizing the first audio file and the first video segment.

14. The method of claim 13 wherein the synchronizing includes the second audio file and the second video segment.

15. The method of claim 1 wherein the streaming the first video segment and the streaming the second video segment comprise a short-form video.

16. The method of claim 15 further comprising enabling an ecommerce purchase, within the short-form video, of the one or more products for sale.

17. The method of claim 16 wherein the ecommerce purchase includes a representation of the one or more products for sale in an on-screen product card.

18. The method of claim 16 wherein the enabling the ecommerce purchase includes a virtual purchase cart.

19. The method of claim 18 wherein the virtual purchase cart covers a portion of the short-form video.

20. A computer program product embodied in a non-transitory computer readable medium for video streaming, the computer program product comprising code which causes one or more processors to perform operations of:

accessing a plurality of audio files, wherein each audio file in the plurality of audio files comprises a section of an answer to a user, wherein the answer is related to one or more products for sale, and wherein the answer is based on a large language model;

producing a first video segment, wherein the first video segment is based on a first audio file within the plurality of audio files, wherein the producing includes animating an artificial intelligence virtual assistant, wherein the animating is based on the first audio file;

streaming, within an embedded interface, the first video segment, wherein the streaming the first video segment includes the first audio file;

creating a second video segment, wherein the second video segment is based on a second audio file within the plurality of audio files, wherein the animating includes the second audio file;

buffering a length of the second video segment, wherein the length of the second video segment that was buffered is determined by a probabilistic model, wherein the buffering occurs during the streaming the first video segment; and streaming the second video segment, wherein the streaming the second video segment includes the second audio file, wherein the streaming the first video segment is complete.

21. A computer system for video streaming comprising:

a memory which stores instructions;

one or more processors coupled to the memory wherein the one or more processors, when executing the instructions which are stored, are configured to:

access a plurality of audio files, wherein each audio file in the plurality of audio files comprises a section of an answer to a user, wherein the answer is related to one or more products for sale, and wherein the answer is based on a large language model;

produce a first video segment, wherein the first video segment is based on a first audio file within the plurality of audio files, wherein the producing includes animating an artificial intelligence virtual assistant, wherein the animating is based on the first audio file;

stream, within an embedded interface, the first video segment, wherein the streaming the first video segment includes the first audio file;

create a second video segment, wherein the second video segment is based on a second audio file within the plurality of audio files, wherein the animating includes the second audio file;

buffer a length of the second video segment, wherein the length of the second video segment that was buffered is determined by a probabilistic model, wherein the buffering occurs during the streaming the first video segment; and stream the second video segment, wherein the streaming the second video segment includes the second audio file, wherein the streaming the first video segment is complete.

* * * * *